(12) United States Patent
Nishimiya et al.

(10) Patent No.: US 12,240,210 B2
(45) Date of Patent: Mar. 4, 2025

(54) LAMINATE AND CONTAINER AND PACKAGE FOR FOOD

(71) Applicant: EARTH CREATE CO., LTD., Osaka (JP)

(72) Inventors: Yoshiyuki Nishimiya, Osaka (JP); Yasutaka Yanase, Osaka (JP)

(73) Assignee: EARTH CREATE CO., LTD., Osaka (JP)

( * ) Notice: Subject to any disclaimer, the term of this patent is extended or adjusted under 35 U.S.C. 154(b) by 317 days.

(21) Appl. No.: 17/904,037

(22) PCT Filed: Feb. 12, 2021

(86) PCT No.: PCT/JP2021/005195
§ 371 (c)(1),
(2) Date: Aug. 11, 2022

(87) PCT Pub. No.: WO2021/162080
PCT Pub. Date: Aug. 19, 2021

(65) Prior Publication Data
US 2023/0118439 A1  Apr. 20, 2023

(30) Foreign Application Priority Data
Feb. 12, 2020 (JP) .................................. 2020-021483

(51) Int. Cl.
*B32B 27/20* (2006.01)
*B32B 7/02* (2019.01)
(Continued)

(52) U.S. Cl.
CPC ............... *B32B 27/20* (2013.01); *B32B 7/02* (2013.01); *B32B 27/08* (2013.01); *B32B 27/32* (2013.01);
(Continued)

(58) Field of Classification Search
None
See application file for complete search history.

(56) References Cited

U.S. PATENT DOCUMENTS

| 4,842,951 A | 6/1989 | Yamada et al. |
| 6,383,589 B1 * | 5/2002 | Horan ..................... B32B 27/32 |
| | | 428/168 |

(Continued)

FOREIGN PATENT DOCUMENTS

| EP | 2 623 555 A1 | 8/2013 |
| EP | 2 623 555 B1 | 11/2015 |

(Continued)

OTHER PUBLICATIONS

International Search Report issued in PCT/JP2021/005195; mailed Apr. 13, 2021.
(Continued)

*Primary Examiner* — James C Yager
(74) *Attorney, Agent, or Firm* — Studebaker & Brackett PC

(57) ABSTRACT

A laminate of the present invention is a laminate with a sheet shape for vacuum forming, pressure forming, or warm forming that includes an inner layer and paired outer layers layered on the respective opposite sides of the inner layer. The inner layer contains an inorganic filler and a thermoplastic resin. The outer layers contains a thermoplastic resin. The inorganic filler contains calcium carbonate particles. The inorganic filler has a percentage content of greater than 50.0% by mass in the laminate. The outer layers each have a thickness at a ratio to the total thickness of the laminate of at least 2.0% and no greater than 20.0%. The total thickness of the laminate is at least 300 μm and no greater than 450 μm. The maximum particle diameter of the calcium carbonate particles is no greater than 20 μm.

4 Claims, 2 Drawing Sheets

(51) Int. Cl.
*B32B 27/08* (2006.01)
*B32B 27/32* (2006.01)
*B65D 65/40* (2006.01)

(52) U.S. Cl.
CPC .......... *B65D 65/40* (2013.01); *B32B 2250/03* (2013.01); *B32B 2250/242* (2013.01); *B32B 2250/40* (2013.01); *B32B 2264/104* (2013.01); *B32B 2264/303* (2020.08); *B32B 2307/306* (2013.01); *B32B 2307/558* (2013.01); *B32B 2307/72* (2013.01); *B32B 2307/732* (2013.01); *B32B 2439/70* (2013.01); *Y10T 428/1352* (2015.01)

(56) References Cited

U.S. PATENT DOCUMENTS

| | | |
|---|---|---|
| 2006/0040100 A1 | 2/2006 | Nemoto et al. |
| 2009/0194561 A1 | 8/2009 | Quasters |
| 2019/0022988 A1* | 1/2019 | Chen .................. B32B 27/30 |

FOREIGN PATENT DOCUMENTS

| | | |
|---|---|---|
| JP | S62-275748 A | 11/1987 |
| JP | 2005-022300 A | 1/2005 |
| JP | 2012-207225 A | 10/2012 |
| JP | 2014-162495 A | 9/2014 |
| JP | 2016-175704 A | 10/2016 |
| JP | 2016-198998 A | 12/2016 |
| WO | 2017/171038 A1 | 10/2017 |

OTHER PUBLICATIONS

An Office Action mailed by China National Intellectual Property Administration on Apr. 11, 2023, which corresponds to Chinese Patent Application No. 202180014368.1 and is related to U.S. Appl. No. 17/904,037; with English language translation.

* cited by examiner

LAMINATE AND CONTAINER AND PACKAGE FOR FOOD

TECHNICAL FIELD

The present invention relates to a laminate, a container for food, and a package for food.

BACKGROUND ART

In sales of various products, a container is used to hold a product and a package is used to cover a product. In the following, the container and the package may be generally referred to as container and package, respectively. In particular, containers and packages for food are widely used in sales of food products for convenience and hygiene reasons.

A container or a package such as above can be obtained for example by forming a sheet-shaped material (also referred to below as resin sheet) containing a thermoplastic resin (e.g., polyethylene resin, polypropylene resin, or polystyrene resin). The resin sheet, which has excellent formability derived from the thermoplastic resin, is suitable as a material of the container and the package.

Recently, it has been proposed to add more than 50.0% by mass of an inorganic material to the resin sheet (see Patent Literature 1, for example). A container or a package formed of a resin sheet containing a large amount of an inorganic material such as above is classified neither as plastic containers and nor as packaging defined in the Container and Packaging Recycling Law. Furthermore, the container and the package formed of a resin sheet containing a large amount of an inorganic material have a low percentage of resin, resulting in relatively low carbon dioxide emission during incineration. Therefore, the container and the package formed of a resin sheet containing a large amount of an inorganic material can be disposed of as combustible or noncombustible waste, resulting in low disposal costs.

CITATION LIST

Patent Literature

Patent Literature 1:
Japanese Patent Application Laid-Open Publication No. 2012-207225

SUMMARY OF INVENTION

Technical Problem

However, the present inventor has studied to find that a resin sheet material containing a large amount of an inorganic material has insufficient formability.

Furthermore, containers and packages for food may be required to be heat-resistant enough to withstand microwave heating and acid-resistant enough to withstand acidic food (e.g., salted Japanese apricots or vinegar) in some cases depending on application. The present inventor has studied to find that any of a container and a package for food formed of a resin sheet not containing an inorganic material and a container and a package for food formed of a resin sheet containing a large amount of an inorganic material are insufficient in acid resistance or heat resistance.

The present invention has been made in view of the foregoing and has its object of providing a laminate with excellent formability from which a container or a package with excellent heat resistance, excellent acid resistance, and low disposal costs can be formed and also providing a container and a package for food formed of the laminate.

Solution to Problem

A laminate according to the present invention is a laminate with a sheet shape for vacuum forming, pressure forming, or warm forming and includes an inner layer and paired outer layers layered on respective opposite sides of the inner layer. The inner layer contains an inorganic filler and a thermoplastic resin. The paired outer layers contain a thermoplastic resin. The inorganic filler contains calcium carbonate particles. The inorganic filler has a percentage content of greater than 50.0% by mass in the laminate. The paired outer layers each have a thickness at a ratio to a total thickness of the laminate of at least 2.0% and no greater than 20.0%. The total thickness of the laminate is at least 300 μm and no greater than 450 μm. A maximum particle diameter of the calcium carbonate particles is no greater than 20 μm.

A container and a package for food according to the present invention are formed by forming the aforementioned laminate by vacuum forming, pressure forming, or warm forming.

Advantageous Effects of Invention

The laminate according to the present invention is excellent in formability and can be formed into a container or a package with excellent heat resistance, excellent acid resistance, and low disposal costs. The container and package for food according to the present invention have excellent heat resistance, excellent acid resistance, and low disposal costs.

BRIEF DESCRIPTION OF DRAWINGS

FIG. 1 is a cross-sectional view illustrating an example of structure of a laminate according to the present invention.

FIG. 2 is an electron micrograph showing a section of an inner layer of a laminate produced in Example.

DESCRIPTION OF EMBODIMENTS

The following describes embodiments of the present invention. However, the present invention is not limited in any way to the embodiments and can be practiced with appropriate alterations within the scope of the object of the present invention. As to each material described in the embodiments of the present invention, one type thereof may be used independently or two or more types thereof may be used in combination.

First Embodiment: Laminate

A laminate according to a first embodiment of the present invention includes an inner layer and paired outer layers layered on the respective opposite sides of the inner layer. The inner layer contains an inorganic filler and a thermoplastic resin. The outer layers contain a thermoplastic resin. The inorganic filler contains calcium carbonate particles. The inorganic filler has a percentage content of greater than 50.0% by mass in the laminate of the present invention. The outer layers each have a thickness at a ratio to the total thickness of the laminate of the present invention of at least 2.0% and no greater than 20.0%. The laminate of the present invention is excellent in formability and can be form into a container and a package with excellent heat resistance and acid resistance and low disposal costs.

Figure 1:
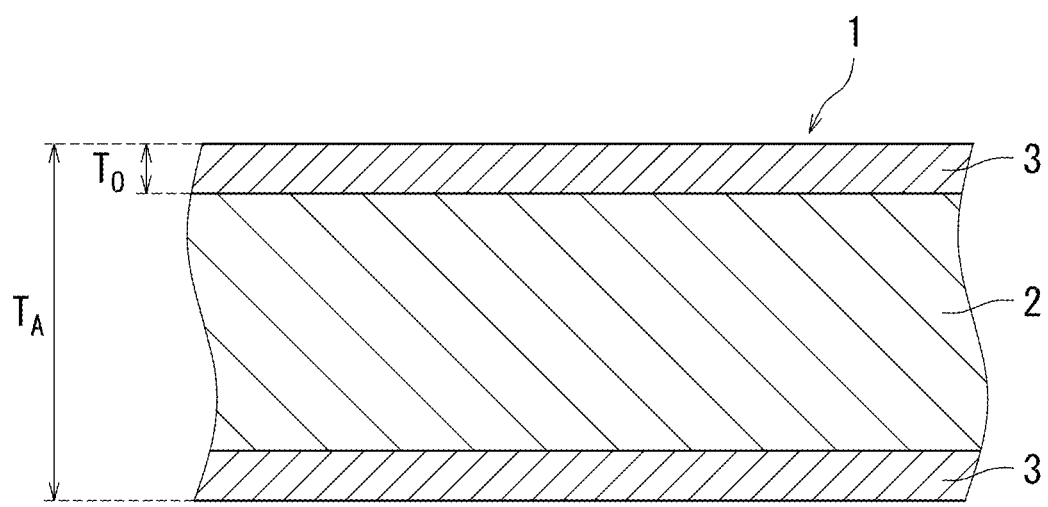
FIG. 1

The laminate of the present invention will be described below in detail with reference to an accompanying drawing. FIG. 1 is a cross-sectional view of a laminate 1 which is an example of the laminate of the present invention. The laminate 1 includes an inner layer 2 and paired outer layers 3 layered on the respective opposite sides of the inner layer 2. The outer layers 3 each have a thickness $T_O$ at a ratio to a total thickness $T_A$ of the laminate 1 of at least 2.0% and no greater than 20.0%. The laminate of the present invention has been described in detail so far with reference to the drawing. However, the structure of the laminate of the present invention is not limited to the structure of the laminate 1 illustrated in FIG. 1. For example, the laminate of the present disclosure may further include an additional layer in addition to the inner layer and the paired outer layers. Examples of the additional layer include protective layers covering the outer layers.

The reason why the laminate of the present disclosure can offer the above advantages are presumed as follows. The laminate of the present invention contains an inorganic filler and a thermoplastic resin. The inorganic filler has a percentage content of greater than 50.0% by mass in the laminate of the present invention. Here, the Container and Packaging Recycling Law classifies containers and packages according to the respective materials thereof that have the largest mass ratio. Specific containers and packages (e.g., glass containers, paper containers and packages, PET bottles, and plastic containers and packages) are subjected to recycling obligations. By contrast, the container and the package formed of the laminate of the present invention, in which the inorganic filler has the largest mass ratio, are not subjected to the recycling obligations. The container and the package formed of the laminate of the present invention contain a thermoplastic resin at a low percentage content, resulting in relatively low carbon dioxide emission during incineration. Therefore, the container and the package formed of the laminate of the present invention can be disposed of as combustible or noncombustible waste, resulting in low disposal costs.

Furthermore, the laminate of the present invention has a three-layer structure including the inner layer and the paired outer layers. Here, a resin sheet containing a large amount of an inorganic filler tends to have low formability (particularly, stretchability) as compared with a resin sheet not containing an inorganic filler. In detail, when the resin sheet containing a large amount of an inorganic filler is stretched at a high magnification (e.g., about 4 times), the resin sheet may be insufficiently stretched and holes may be formed. By contrast, the inner layer of the laminate of the present invention is covered with the paired outer layers. The paired outer layers, which contain not so large amount of an inorganic filler unlike the inner layer, are excellent in stretchability. Therefore, in the laminate of the present invention, even if the inner layer is insufficiently stretched in a stretch at a high magnification, the outer layers can be stretched sufficiently, so that holes are difficult to be formed through the laminate.

Moreover, containers and packages for food may be required to have heat resistance and acid resistance in some cases. Here, the inorganic filler functions as a filler in a container and a package formed of a resin sheet containing an inorganic filler. Therefore, the container and the package tend to have excellent heat resistance as compared with a container and a package formed of a resin sheet not containing an inorganic filler. However, the container and the package formed of a resin sheet containing an inorganic filler, in which the inorganic filler may react with an acid, tend to have low acid resistance. By contrast, the laminate according to the present invention, which includes the inner layer containing an inorganic filler, renders the formed container or package heat resistant. Furthermore, the laminate of the present invention has excellent acid resistance because the inner layer thereof containing an inorganic filler is covered with the outer layers. As such, as a result of including the inner layer covered with the paired outer layers, the laminate of the present invention can render the container and the package excellent in heat resistance derived from the inner layer and acid resistance derived from the outer layers.

The outer layers each have a thickness at a ratio to the total thickness of the laminate of the present invention of at least 2.0% and no greater than 20.0%. As a result of the outer layers having an appropriately thin thickness as above, the laminate of the present invention can have excellent formability derived from the outer layers while maintaining excellent heat resistance derived from the inner layer.

The laminate of the present invention has a density of preferably at least 1.20 $g/cm^3$ and no greater than 1.70 $g/cm^3$, more preferably at least 1.30 $g/cm^3$ and no greater than 1.50 $g/cm^3$, and further preferably at least 1.35 $g/cm^3$ and no greater than 1.45 $g/cm^3$.

Figure 2:
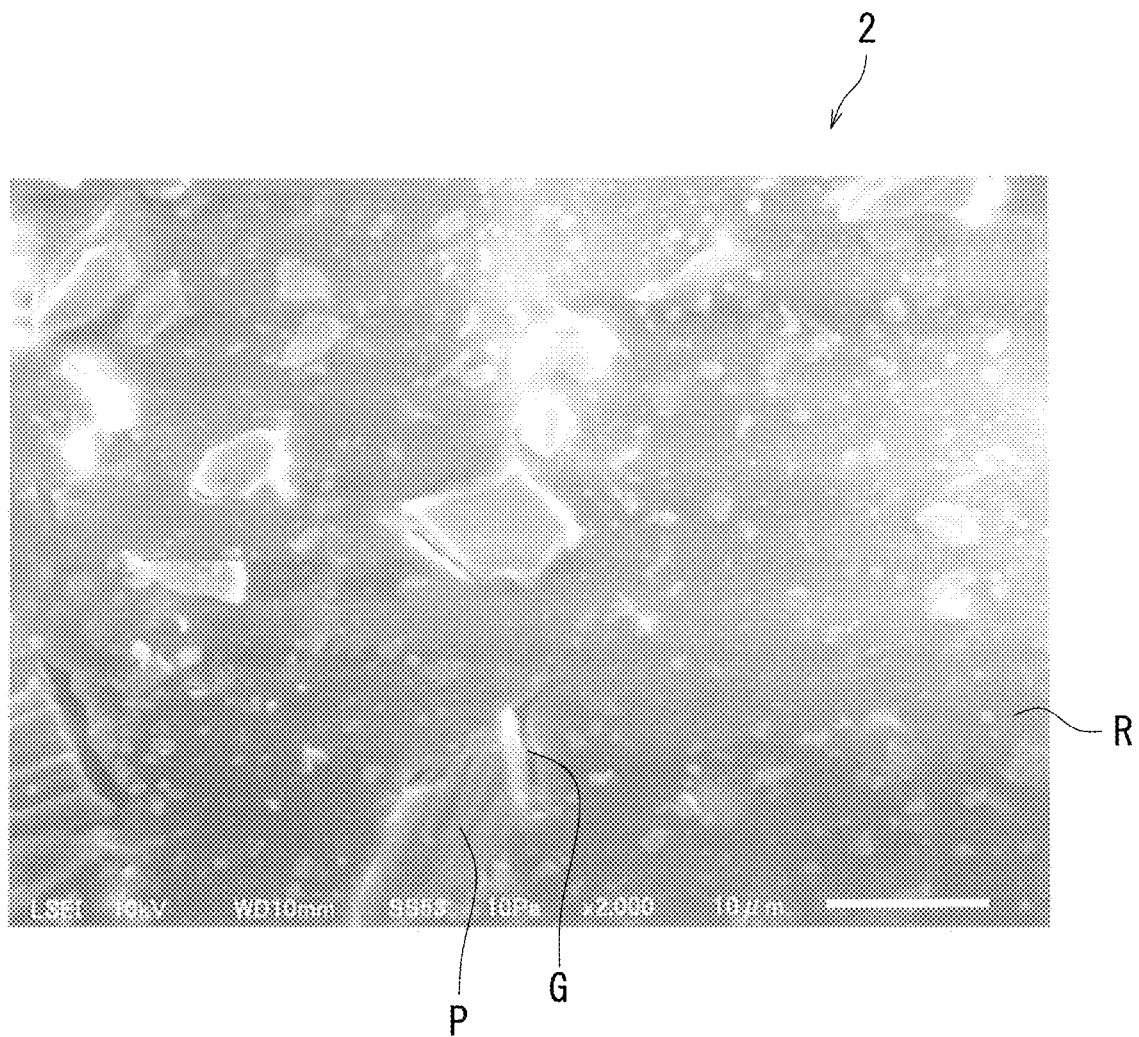
FIG. 2

Here, the inner layer of the laminate of the present invention contains calcium carbonate particles and a thermoplastic resin, which are different from each other in physical property. Therefore, certain voids are formed in the inner layer. The more voids, the lower the density of the laminate of the present invention. The following describes voids that may be present in the laminate of the present invention with reference to an accompanying drawing. FIG. 2 is an electron micrograph showing a section of an inner layer 2 of a laminate 1 of the present invention produced in Example described later. The inner layer 2 contains a thermoplastic resin R and calcium carbonate particles P. As shown in FIG. 2, a void G is formed at the boundary between the thermoplastic resin R and a calcium carbonate particle P. The void G is considered to be inevitably formed in production of the laminate 1 of the present invention due to a difference in thermal expansion coefficient between the thermoplastic resin R and the calcium carbonate particles P. When the laminate 1 of the present invention is stretched at a high magnification, a hole starting from the void G may be formed in the inner layer 2. The voids that may be present in the laminate of the present invention have been described so far with reference to the accompanying drawing. As a result of the density of the laminate of the present invention being set to at least 1.20 $g/cm^3$, the voids in the inner layer can be reduced. As a result, formability of the laminate of the present invention can be increased.

Examples of a method for increasing the density of the laminate of the present invention include, as described later, reduction in maximum particle diameter of the calcium carbonate particles and surface treatment on calcium carbonate.

The total thickness of the laminate of the present invention is preferably at least 300 μm and no greater than 450 μm, and more preferably at least 370 μm and no greater than 430 μm. As a result of the total thickness of the laminate of the present invention being set to at least 300 μm, strength of the container and the package formed of the laminate of the present invention can be increased. As a result of the total thickness of the laminate of the present invention being set to no greater than 450 μm, the container and the package formed of the laminate of the present invention can be lightened.

[Inner Layer]

The inner layer contains an inorganic filler and a thermoplastic resin. The inorganic filler in the inner layer is dispersed in a matrix of the thermoplastic resin.

The thickness of the inner layer is preferably at least 250 μm and no greater than 420 μm, and more preferably at least 350 μm and no greater than 400 μm. When the thickness of the inner layer is set to at least 250 μm, heat resistance of the container and the package formed of the laminate of the present invention can be increased. When the thickness of the inner layer is set to no greater than 420 μm, formability of the laminate of the present invention can be further increased.

(Inorganic Filler)

The inorganic filler contains calcium carbonate particles. Here, the purity of the calcium carbonate particles used as the inorganic filler largely depends on a source where the calcium carbonate particles come from. In detail, almost all types of calcium carbonate particles used as an inorganic filler are obtained by directly converting calcium carbonate ore obtained as a mineral resource into particles without refining. Therefore, the purity of the calcium carbonate particles greatly depends on the region of origin. For example, depending on the region of origin, there are low-purity calcium carbonate particles with a percentage content of calcium carbonate of about 70% by mass. By contrast, there are high-purity calcium carbonate particles obtained by chemical synthesis as calcium carbonate particles for food use or pharmaceutical use.

The laminate of the present invention preferably contains calcium carbonate particles with as high purity as possible. Specifically, the percentage content of calcium carbonate in the calcium carbonate particles is preferably at least 90% by mass, more preferably at least 95% by mass, and further preferably at least 97% by mass. The higher the purity of the calcium carbonate particles is, the higher the safety of the calcium carbonate particles to the environment is. When the percentage content of calcium carbonate in the calcium carbonate particles is set to at least 90% by mass, impact on the environment can be reduced.

The maximum particle diameter of the calcium carbonate particles is preferably no greater than 20 μm. Here, voids present in the boundaries between the calcium carbonate particles and the thermoplastic resin in the inner layer are considered to be readily formed as the particle diameter of the calcium carbonate particles increases. Therefore, as a result of the maximum particle diameter of the calcium carbonate particles being set to no greater than 20 μm, formation of voids at the boundaries between the calcium carbonate particles and the thermoplastic resin can be inhibited. This can further increase formability of the laminate of the present invention.

Note that the maximum particle diameter of the calcium carbonate particles can be determined according to the following method. First, the particle diameters (major axes) of calcium carbonate particles are measured at each of 5 locations (field of view: 100 μm×100 μm) randomly selected in a section of the inner layer using an electron microscope. A maximum value of the particle diameters of the measured calcium carbonate particles is taken to be a maximum particle diameter of the calcium carbonate particles.

The calcium carbonate particles may be subjected to surface treatment. Examples of the surface treatment include treatment with a silane coupling agent and treatment with metal soap (e.g., treatment with calcium stearate). When the calcium carbonate particles are subjected to surface treatment, formation of voids at the boundaries between the calcium carbonate particles and the thermoplastic resin can be inhibited. This can further increase formability of the laminate of the present invention.

The percentage content of the inorganic filler is preferably at least 53.0% by mass and no greater than 70.0% by mass in the inner layer, and more preferably at least 55.0% by mass and no greater than 60.0% by mass. As a result of the percentage content of the inorganic particles in the inner layer being set to at least 53.0% by mass, heat resistance of the container and the package formed of the laminate of the present invention can be increased. As a result of the percentage content of the calcium carbonate particles in the inner layer being set to no greater than 70.0% by mass, stretchability of the inner layer can be increased.

The percentage content of the inorganic filler is greater than 50.0% by mass in the laminate of the present invention, preferably greater than 50.0% by mass and no greater than 60.0% by mass, and more preferably greater than 50.0% by mass and no greater than 55.0% by mass. As a result of the percentage content of the inorganic filler in the laminate of the present invention being set to greater than 50.0% by mass, heat resistance of the container and the package formed of the laminate of the present invention can be increased. Furthermore, the container and the package formed of the laminate of the present invention are not subjected to the recycling obligations prescribed in the Container and Packaging Recycling Law. Moreover, carbon dioxide emission during incineration of the container or the package formed of the laminate of the present invention can be reduced. Further, inorganic fillers are typically less expensive than thermoplastic resin. Therefore, use of a large amount of an inorganic filler can result in reduction in costs of the materials of the laminate of the present invention. When the percentage content of the inorganic filler in the laminate of the present invention is set to no greater than 60.0% by mass, formability of the laminate of the present invention can be further increased.

The inner layer may contain an additional inorganic filler other than the calcium carbonate particles. Example of the additional inorganic filler include calcium sulfate particles, barium sulfate particles, kaolin particles, mica particles, zinc oxide particles, dolomite particles, glass fiber, hollow glass microbeads, silica particles, chalk particles, talc, pigment particles, titanium dioxide particles, silicon dioxide particles, bentonite, clay, diatomaceous earth, and zeolite. The calcium carbonate particles are suitable as an inorganic filler due to its low cost and consistent availability as compared with the additional inorganic filler.

The percentage content of the calcium carbonate particles in the inorganic filler is preferably at least 90% by mass, and more preferably 100% by mass.

(Thermoplastic Resin)

Examples of the thermoplastic resin contained in the inner layer include polyolefin resin, ABS resin, polyamide resin, polystyrene resin, and polyester resin (e.g., polyethylene terephthalate resin and polybutylene terephthalate resin).

Examples of the polyolefin resin include polyethylene resins and polypropylene resin. Examples of the polyethylene resin include high density polyethylene (HDPE), low density polyethylene (LDPE), medium density polyethylene, and linear low density polyethylene (L-LDPE).

A polyolefin resin including polyethylene resin is preferable as the polyolefin resin. In this case, the percentage content of the polyethylene resin in the polyolefin resin is preferably at least 50% by mass. When the inner layer contains the polyolefin resin and the percentage content of the polyethylene resin in the polyolefin resin is set to at least 50% by mass, the laminate of the present invention can exhibit favorable formability in a wide temperature range of at least 150° C. and no greater than 200° C.

Note that polyolefin resin including at least 90% by mass of polypropylene resin is also preferable as the polyolefin resin.

A mixed resin of a high density polyethylene and at least one of a low density polyethylene and a linear low density polyethylene is preferable as the polyethylene resin. In the mixed resin, the total percentage content of the low density polyethylene and the linear low density polyethylene is preferably at least 10% by mass and no greater than 50% by mass. The above mixed resin is a resin combination of a high density polyethylene excellent in strength and either or both a low density polyethylene and a linear low density polyethylene excellent in formability. Therefore, use of the above mixed resin can increase strength and formability of the inner layer.

The thermoplastic resin contained in the inner layer is preferably polyolefin resin or polystyrene resin, and more preferably polyethylene resin, polypropylene resin, or polystyrene resin.

(Additional Additive)

The inner layer may further contain an additional additive other than the inorganic filler. Examples of the additional additive include a coupling agent, a lubricant, a filler dispersant, an antistatic agent, an antioxidant, a heat stabilizer, an ultraviolet absorbing agent, and a weather stabilizer.

As described above, the percentage content of the inorganic filler is high in the inner layer. Therefore, the inner layer preferably contains a filler disperser as the additional additive. When the inner layer contains a filler dispersant, dispersibility of the inorganic filler can be increased. Examples of the filler dispersant include metal soap (e.g., calcium stearate and magnesium stearate). Where the inner layer contains an additional additive, the percentage content of the additional additive is preferably at least 0.5% by mass and no greater than 5.0% by mass in the inner layer.

[Outer Layers]

The outer layers each are a layer containing a thermoplastic resin. The ratio of the thickness of each outer layer to the total thickness of the laminate of the present invention is at least 2.0% and no greater than 20.0%, and preferably at least 4.0% and no greater than 10.0%. As a result of the ratio of the thickness of each outer layer being set to at least 2.0%, formability of the laminate of the present invention can be increased. As a result of the ratio of the thickness of each outer layer being set to no greater than 20.0%, the percentage content of the inorganic filler in the laminate of the present invention can be easily adjusted to greater than 50.0% by mass. Note that the thicknesses of the outer layers may be the same as or different from each other.

The thickness of each outer layer is preferably at least 10 μm and no greater than 80 μm, and more preferably at least 15 μm and no greater than 30 μm. When the thickness of each outer layer is set to at least 10 μm, formability of the laminate of the present invention can be further increased. When the thickness of each outer layer is set to no greater than 80 μm, the percentage content of the inorganic filler in the laminate of the present invention can be easily adjusted to greater than 50.0% by mass.

Examples of the thermoplastic resin contained in the outer layers are the same resins as those listed as the examples of the thermoplastic resin contained in the inner layer. The thermoplastic resin contained in the outer layers is preferably polyolefin resin or polystyrene resin, and more preferably polyethylene resin, polypropylene resin, or polystyrene resin.

The percentage content of the thermoplastic resin in each outer layer is preferably at least 90% by mass, and more preferably at least 95% by mass.

The outer layers preferably do not contain an inorganic filler, but may contain a small amount of an inorganic filler. The content percentage of the inorganic filler in each outer layer is preferably at least 0% by mass and no greater than 10% by mass, and more preferably at least 0% by mass and no greater than 5% by mass.

[Use]

The laminate of the present invention can be used as a material of containers and packages (especially, containers and packages for food), for example. In detail, a container or a package can be formed by forming the laminate of the present invention into a desired shape. Examples of a method for forming the laminate of the present invention include vacuum forming, pressure forming, and warm forming.

[Production Method]

The laminate of the present invention can be produced by a known multilayer T-die method, for example. In detail, a material for inner layer formation (material containing a thermoplastic resin and an inorganic filler) and a material for outer layer formation (material containing thermoplastic resin) are prepared. Thereafter, the material for inner layer formation and the material for outer layer formation are separately extruded from a plurality of extruders and layered inside a T-die. The laminate of the present invention can be obtained in the manner described above.

Second Embodiment: Container and Package for Food

A container and a package for food according to a second embodiment of the present invention are formed of the laminate according to the first embodiment. Specific examples of the container and the package for food of the present invention include lunch containers, food packs, frozen food containers, food trays, cups (e.g., drink cups), and cup lids. The container and the package for food of the present invention are excellent in heat resistance and acid resistance and have low disposal costs.

The container and the package for food of the present invention each have the same layer structure as the laminate according to the first embodiment. However, the layers of the container and the package for food of the present invention may be formed to have thicknesses different from the corresponding layers of the laminate according to the first embodiment. For example, the container or the package for food of the present invention may have parts different in thickness. In this case, the thickness of the thickest part of the container or the package for food of the present invention is preferably at least 2.0 times and no greater than 4.5 times that of the thinnest part thereof, and more preferably at least 3.5 times and no greater than 4.5 times.

Example

The following further describes the present invention by using Example. However, the present invention is not limited to Example.

[Materials]

Masterbatches of a material for inner layer formation and a material for outer layer formation were obtained by kneading and chipping the materials listed below using a twin shaft kneader.

Material for inner layer formation: 43 parts by mass of polypropylene resin and 57 parts by mass of calcium carbonate particles Material for outer layer formation: 100 parts by mass of polypropylene resin A laminate including an inner layer and paired outer layers layered on the respective opposite sides of the inner layer was formed by the multilayer T-die method. The inner layer was formed with the above material for inner layer formation. Each of the paired outer layers was formed with the above material for outer layer formation. The total thickness of the laminate was 420 μm. The thickness of the inner layer was 378 μm (90% to the total thickness of the laminate). The thickness of each of the paired outer layers was 21 μm (5% to the total thickness of the laminate). The percentage content of the inorganic filler was 54% by mass in the laminate. The density of the laminate was 1.38 g/cm$^3$. The resultant laminate was taken to be a laminate of Example.

Separately, a single-layer resin sheet was produced by a T-die method. The resin sheet was formed with the above-mentioned material for outer layer formation. The thickness of the resin sheet was 420 μm. The resultant sheet was taken to be a resin sheet of Comparative Example.

[Formability]

The laminate of Example and the resin sheet of Comparative Example were each pre-heated using a far infrared heater, and formed into a cup-shaped container with a bottom diameter of 52 mmφ, an opening diameter of 65 mmφ, a height of 30 mm, and a flange width of 8 mm using a vacuum forming machine. The resultant cups were taken to be containers of Example and Comparative Example. The containers of Example and Comparative Example were each visually observed to evaluate the appearance thereof according to the following criteria.

Good: surface state was good (neither deformation nor tears were observed)

Poor: surface state was poor (either deformation or tears were observed)

As a result, both the containers of Example and Comparative Example had good appearance. From the above, it can be determined that the laminate of Example used in formation of the container of Example had excellent formability.

[Impact Resistance]

Five containers of Example and five containers of Comparative Example were prepared. Water was charged into each of the containers to fill the containers with the water. Next, each of the containers was sealed by sealing after putting a lid thereon. Next, an operation of free-falling on concrete from a height of 1.0 m in an upright position was repeated 5 times for each of the containers. The number (number of breaks) of containers broken through the above operation was counted.

As a result, the number of breakages was 0 in each of the containers of Example and Comparative Example. From the above, it can be determined that the container formed of the laminate of Example had excellent impact resistance.

[Heat Resistance]

Each of the containers of Example and Comparative Example was charged with 20 mL of soya oil. Next, each of the containers was heated at 800 W for 3 minutes using a microwave oven. Thereafter, the heated containers were visually observed to evaluate heat resistance thereof according to the following criteria.

Good: neither deformation nor tears were observed in container

Poor: either deformation or tears were observed in container

As a result, the container of Example was evaluated as good in heat resistance. By contrast, the container of Comparative Example was evaluated as poor in heat resistance. From the above, it was confirmed that the container of Example produced with the laminate of Example was more excellent in heat resistance than the container of Comparative Example produced with the resin sheet (containing only polypropylene) of Comparative Example.

[Acid Resistance]

Although no tests were carried out, the container of Example in which the inner layer containing the inorganic filler is covered with the outer layers is determined to be naturally excellent in acid resistance.

From the above results, it can be determined that the laminate of the present invention can have excellent formability and can be formed into a container or a package excellent in impact resistance, heat resistance, and acid resistance. Furthermore, the container and the package for food of the present invention are determined to be excellent in impact resistance, heat resistance, and acid resistance.

INDUSTRIAL APPLICABILITY

The laminate of the present invention is usable as a material of a container and a package. The container and the package for food of the present invention can be used for sales of food products.

The invention claimed is:

1. A laminate with a sheet shape for vacuum forming, pressure forming, or match molding, comprising:
an inner layer; and
paired outer layers layered on respective opposite sides of the inner layer, wherein
the inner layer contains an inorganic filler and a thermoplastic resin,
the paired outer layers contain a thermoplastic resin,
the inorganic filler contains calcium carbonate particles,
the inorganic filler has a percentage content of greater than 50.0% by mass in the laminate,
the paired outer layers each have a thickness at a ratio to a total thickness of the laminate of at least 2.0% and no greater than 20.0%,
the laminate has a density of at least 1.20 g/cm$^3$ and no greater than 1.70 g/cm$^3$,
the total thickness of the laminate is at least 300 μm and no greater than 450 μm, and
a maximum particle diameter of the calcium carbonate particles is no greater than 20 μm.

2. The laminate according to claim 1, wherein
the thermoplastic resin contained in the inner layer includes polypropylene, and
the thermoplastic resin contained in the paired outer layers includes polypropylene.

3. The laminate according to claim 1, wherein
the inorganic filler has a content percentage of at least 53.0% by mass and no greater than 70.0% by mass in the inner layer.

4. A container or a package formed by forming the laminate according to claim 1 by vacuum forming, pressure forming, or match molding forming.

\* \* \* \* \*